United States Patent
Lee et al.

(10) Patent No.: US 10,084,167 B2
(45) Date of Patent: Sep. 25, 2018

(54) METHOD OF PREPARING SEPARATOR, SEPARATOR PREPARED THEREFROM, AND ELECTROCHEMICAL DEVICE HAVING THE SAME

(71) Applicants: LG Chem, Ltd., Seoul (KR); TORAY INDUSTRIES, INC., Tokyo (JP)

(72) Inventors: Joo-Sung Lee, Daejeon (KR); Bo-Kyung Ryu, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 265 days.

(21) Appl. No.: 14/302,514

(22) Filed: Jun. 12, 2014

(65) Prior Publication Data

US 2014/0295285 A1 Oct. 2, 2014

Related U.S. Application Data

(63) Continuation of application No. PCT/KR2013/010235, filed on Nov. 12, 2013.

(30) Foreign Application Priority Data

Nov. 12, 2012 (KR) .................. 10-2012-0127568

(51) Int. Cl.
 *H01M 2/14* (2006.01)
 *H01M 2/16* (2006.01)
 *H01M 10/052* (2010.01)

(52) U.S. Cl.
 CPC .......... *H01M 2/145* (2013.01); *H01M 2/162* (2013.01); *H01M 10/052* (2013.01); *H01M 2220/20* (2013.01); *H01M 2220/30* (2013.01)

(58) Field of Classification Search
 CPC .......... H01M 10/052; H01M 2220/20; H01M 2220/30; H01M 2/145; H01M 2/162; Y02T 10/7011
 See application file for complete search history.

(56) References Cited

U.S. PATENT DOCUMENTS

| 4,264,691 A | 4/1981 | O'Rell et al. |
| 4,818,340 A | 4/1989 | Hasegawa et al. |

(Continued)

FOREIGN PATENT DOCUMENTS

| JP | 2000030686 A | 1/2000 |
| JP | 2011198532 A | 10/2011 |

(Continued)

OTHER PUBLICATIONS

International Search Report for PCT/KR2013/010235 dated Mar. 26, 2014.

(Continued)

*Primary Examiner* — Lingwen R Zeng
(74) *Attorney, Agent, or Firm* — Lerner, David, Littenberg, Krumholz & Mentlik, LLP

(57) ABSTRACT

The present invention refers to a method of preparing a separator, comprising: producing a dispersion comprising inorganic particles, a polymer binder, polymer fibers and a solvent; applying the dispersion on the top surface of a substrate to form a non-woven fabric web as a layer comprising the inorganic particles, the polymer binder and the polymer fiber, in which the inorganic particles are positioned in gaps of the polymer fibers and adhered thereto by the polymer binder; and drying and compressing the non-woven fabric web to obtain a non-woven fabric substrate; a separator prepared by the method; and an electrochemical device comprising the separator.

15 Claims, 1 Drawing Sheet

(56) References Cited

U.S. PATENT DOCUMENTS

| | | | |
|---|---|---|---|
| 2008/0257722 A1* | 10/2008 | Tomba | C25B 13/04 |
| | | | 204/295 |
| 2010/0035127 A1 | 2/2010 | Brilmyer et al. | |
| 2010/0124705 A1* | 5/2010 | Naoi | C08J 7/047 |
| | | | 429/306 |
| 2010/0206804 A1 | 8/2010 | Weber et al. | |
| 2010/0316903 A1* | 12/2010 | Kim | H01M 2/1653 |
| | | | 429/145 |
| 2011/0305941 A1 | 12/2011 | Park et al. | |
| 2012/0003524 A1 | 1/2012 | Jo et al. | |
| 2012/0148901 A1 | 6/2012 | Okamoto | |

FOREIGN PATENT DOCUMENTS

| | | |
|---|---|---|
| JP | 2012014941 A | 1/2012 |
| KR | 20050056892 A | 6/2005 |
| KR | 20110116489 A | 10/2011 |
| KR | 20110136448 A | 12/2011 |
| KR | 20120025575 A | 3/2012 |
| WO | 2005-057700 A1 | 6/2005 |

OTHER PUBLICATIONS

Supplemental Search Report from European Application No. 13853705, dated Dec. 10, 2015.

\* cited by examiner

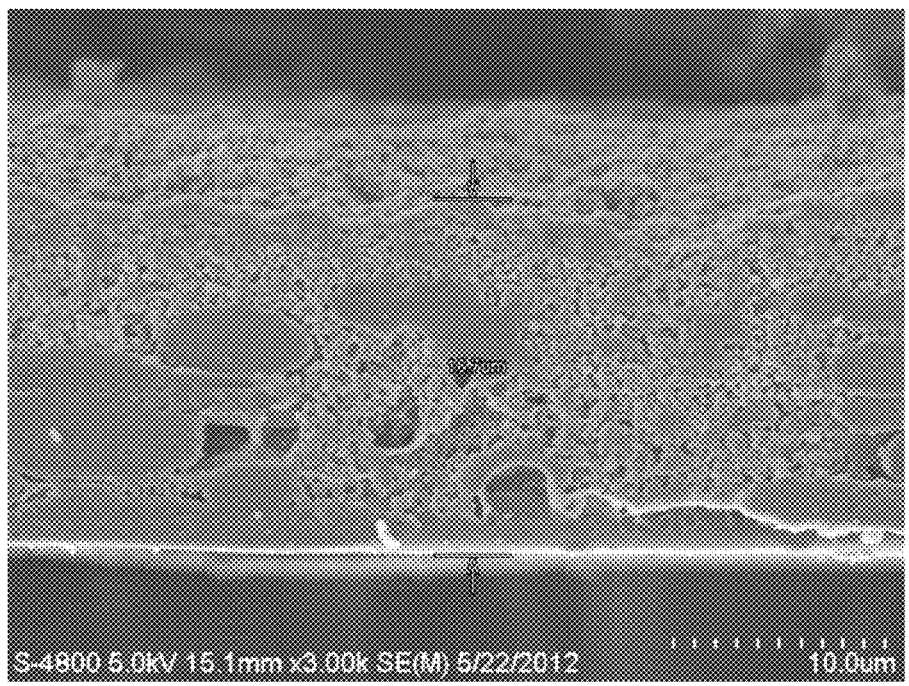

METHOD OF PREPARING SEPARATOR, SEPARATOR PREPARED THEREFROM, AND ELECTROCHEMICAL DEVICE HAVING THE SAME

CROSS-REFERENCE TO RELATED APPLICATION

This application is a continuation of International Application No PCT/KR2013/010235 filed on Nov. 12, 2013, which claims priority under 35 USC 119(a) to Korean Patent Application No. 10-2012-0127568 filed in the Republic of Korea on Nov. 12, 2012, the disclosures thereof are incorporated herein by reference.

TECHNICAL FIELD

The present invention relates to a method of preparing a separator, more specifically a method of preparing a separator by introducing inorganic particles and a polymer binder in micro-sized pores which are present in a non-woven fabric made of polymer fibers. Also, the present invention relates to a separator prepared by the above method and an electrochemical device comprising the separator.

BACKGROUND ART

Recently, there has been an increasing interest in energy storage technology. As the application fields of energy storage technologies have been extended to cellular phones, camcorders, notebook computers, PCs and electric cars, efforts have been increasingly been made towards the research and development of electrochemical devices. In this regard, electrochemical devices are one of the subjects of great interest. Particularly, development of rechargeable secondary batteries has been the focus of attention. Recently, extensive research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni—MH, Ni—Cd, and $H_2SO_4$—Pb batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly prohibit the dangers (such as fire and smoke emission) of electrochemical devices. Overheating of an electrochemical device may cause thermal runaway or a puncture of a separator may pose an increased risk of explosion.

Meanwhile, for cost efficient purposes, electrochemical devices may be prepared by using a porous non-woven substrate as a separator. However, the porous non-woven substrate has weak mechanical strength and is apt to rupture in the preparation of the electrochemical devices. Also, due to the non-woven fabric substrate having large pores, a leak current may occur during battery operation to deteriorate the insulating property of the separator.

DISCLOSURE

Technical Problem

Accordingly, the present invention is designed to solve the above-mentioned problems, and therefore it is directed to providing a method of preparing a separator by controlling the size of pores present in a conventional non-woven fabric substrate, more specifically by sufficiently filling the micro-sized pores of the substrate with inorganic particles and a polymer binder to form nano-sized pores; a separator prepared by the method; and an electrochemical device comprising the separator.

Technical Solution

In accordance with one aspect of the present invention, there is provided a method of preparing a separator, comprising: producing a dispersion comprising inorganic particles, a polymer binder, polymer fibers and a solvent; applying the dispersion on the top surface of a substrate to form a non-woven fabric web as a layer comprising the inorganic particles, the polymer binder and the polymer fiber, in which the inorganic particles are positioned in gaps of the polymer fibers and adhered thereto by the polymer binder; and drying and compressing the non-woven fabric web to obtain a non-woven fabric substrate.

In the present invention, the dispersion may further comprise a dispersant.

The dispersant may be any one selected from the group of consisting of polyvinylpyrrolidone, polyacrylic acid hydrazide, poly-N-vinyl-5-methoxazolidon, N-alkyl polyimine, polyvinylalcohol, N-acetyl polyimine, polyacrylamide, poly-L-lysinhydrobromide, polyacroleine, benzyl-dodecyl-dimethylammonium chloride, polyacrylic acid, polyethylenimine, 4-vinylpyridine, methylvinylketone, and an oligomer thereof.

The dispersion may be produced by dispersing the inorganic particles in the solvent to obtain an inorganic dispersion, and adding the polymer binder and the polymer fibers to the inorganic dispersion.

The inorganic particles may be selected from the group consisting of inorganic particles having a dielectric constant of 5 or higher, inorganic particles having the ability to transport lithium ions, and a mixture thereof.

Examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), $HfO_2$ inorganic particles and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$, type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The inorganic particles may have an average diameter of 0.001 to 100 μm.

Meanwhile, the polymer binder may be selected from the group consisting of polyvinylidene fluoride (PVDF), hexafluoro propylene (HFP), polyvinylidene fluoride-co-hexafluoro propylene, polyvinylidene fluoride-co-trichloro ethylene, styrene butadiene rubber (SBR), carboxymethyl cellulose (CMC), polymethyl methacrylate, polybutylacrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide and a mixture thereof.

The polymer fibers may be selected from the group consisting of polyolefins, polyesters, polyacetals, polyamides, polycarbonates, polyimides, polyetherether ketone, polyether sulfone, polyphenylene oxide, polyphenylene sulfide and a mixture thereof.

Also, the polymer fibers may have an average thickness of 0.05 to 10 μm.

The solvent used in the present invention may be selected from the group consisting of acetone, methanol, ethanol, tetrahydrofuran, methylene chloride, chloroform, dimethylform amide, N-methyl-2-pyrrolidone (NMP), cyclohexane, water and a mixture thereof.

The substrate used in the present invention may be made of glass, silicon or plastic.

In the present invention, the step of drying and compressing the non-woven fabric web may be carried out at a temperature of 60 to 150° C. for 30 seconds to 10 minutes.

The separator prepared by the above method may have an average pore size of 40 to 200 nm.

After obtaining the non-woven fabric substrate, the above method may further comprise applying a slurry comprising inorganic particles, a polymer binder and a solvent on at least one surface of the non-woven fabric substrate, and drying the applied slurry to form a porous coating layer.

In accordance with another aspect of the present invention, there is provided a separator prepared by the above method.

Further, in accordance with still another aspect of the present invention, there is provided an electrochemical device comprising a cathode, an anode, a separator interposed between the cathode and the anode and a non-aqueous electrolyte solution, wherein the separator is defined in the present invention.

The electrochemical device may be a lithium secondary battery.

Advantageous Effects

According to one embodiment of the present invention, in the preparation of a separator, micro-sized pores present in a conventional non-woven fabric substrate are sufficiently filled with inorganic particles and a polymer binder to control the pore size on a nanometer scale, thereby inhibiting the generation of a leak current and thus preventing the insulating property of electrochemical devices using the separator from being deteriorated.

Also, the filling of the inorganic particles in the pores of the non-woven fabric substrate made of polymer fibers can increase the mechanical strength of the separator.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

FIG. 1 is an SEM photograph showing a cross-section of a separator prepared according to one embodiment of the present invention.

BEST MODE

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

In accordance with the present invention, a separator may be prepared as follows:

First, inorganic particles, a polymer binder, polymer fibers and a solvent are mixed to produce a dispersion (SI).

The dispersion may further comprise a dispersant for preventing the agglomeration of the inorganic particles to allow more effective dispersion.

Such a dispersant may be any one selected from the group of consisting of polyvinylpyrrolidone, polyacrylic acid hydrazide, poly-N-vinyl-5-methoxazolidon, N-alkyl polyimine, polyvinylalcohol, N-acetyl polyimine, polyacrylamide, poly-L-lysinhydrobromide, polyacroleine, benzyl-dodecyl-dimethylammonium chloride, polyacrylic acid, polyethylenimine, 4-vinylpyridine, methylvinylketone, and an oligomer thereof. Also, hydrocarbon molecules comprising repeated covalent bonds between monomolecular units and oligomer units and having a molecular weight of 10,000 g/mol, and complex polymers capable of forming a mixed covalent bond together with elements of Group IV may be used as the dispersant.

The dispersion may be produced by mixing and dispersing inorganic particles, a polymer binder, polymer fibers and a solvent at once, or by first dispersing the inorganic particles in the solvent to obtain an inorganic dispersion and then adding the polymer binder and the polymer fibers to the inorganic dispersion. Also, the inorganic dispersion may be subject to a bead-mill process for a more uniform dispersion.

Meanwhile, the inorganic particles which may be used in the present invention are not particularly limited if they are electrochemically stable. That is, the inorganic particles which may be used in the present invention are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher. Non-limiting examples of the inorganic particles having a dielectric constant of 5 or higher include $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), $HfO_2$ inorganic particles and a mixture thereof.

Also, as the inorganic particles, inorganic particles having the ability to transport lithium ions, i.e., lithium-containing inorganic particles which can transfer lithium ions without holding them, may be used. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$, type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

In the separator of the present invention, the inorganic particles are not particularly limited to their size, but preferably have an average diameter of 0.001 to 100 μm for achieving a proper porosity of the separator.

The polymer binder may be selected from the group consisting of polyvinylidene fluoride (PVDF), hexafluoro propylene (HFP), polyvinylidene fluoride-co-hexafluoro propylene, polyvinylidene fluoride-co-trichloro ethylene, styrene butadiene rubber (SBR), carboxymethyl cellulose (CMC), polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethylcellulose, cyanoethylsucrose, pullulan, carboxyl methyl cellulose, acrylonitrile-styrene-butadiene copolymer, polyimide and a mixture thereof.

The polymer fibers may be selected from the group consisting of polyolefins such as high-density polyethylene, low-density polyethylene, linear low-density polyethylene, ultra-high molecular weight polyethylene and polypropylene, polyesters such as polyethylene terephthalate, polybutylene terephthalate and polyethylene naphthalate, polyacetals, polyamides, polycarbonates, polyimides, polyetherether ketone, polyether sulfone, polyphenylene oxide, polyphenylene sulfide and a mixture thereof.

Also, the polymer fibers may have an average thickness of 0.05 to 10 μm, but are not limited thereto.

The solvent used in the present invention may have a low boiling point so that it can be easily removed later. Non-limiting examples of usable solvents may include acetone, methanol, ethanol, tetrahydrofuran, methylene chloride, chloroform, dimethylform amide, N-methyl-2-pyrrolidone (NMP), cyclohexane, water and a mixture thereof.

Next, the dispersion is applied on the top surface of a substrate to form a non-woven fabric web as a layer comprising the inorganic particles, the polymer binder and the polymer fiber, in which the inorganic particles are positioned in gaps of the polymer fibers and adhered thereto by the polymer binder (S2).

In the non-woven fabric web formed by the application of the dispersion on the top surface of the substrate, the polymer fibers and the inorganic particles are present in a uniformly mixed form along the thickness direction of the non-woven fabric web, more specifically, the inorganic particles are well positioned in gaps of the polymer fibers and adhered thereto by the polymer binder, thereby filling pores.

The substrate used in the present invention may be made of glass, silicon or plastic, but is not limited thereto. Among these, when a glass substrate is used, a flat and uniform non-woven fabric web can be formed.

Subsequently, the non-woven fabric web is dried and compressed to obtain a non-woven fabric substrate (S3).

By carrying out the step of S3, the solvent used can be completely removed.

At this time, the thickness of the non-woven fabric substrate obtained above is not particular limited, but may be 5 to 50 μm.

Such a drying step may be carried out at a temperature of 60 to 150° C. for 30 seconds to 10 minutes. When these conditions are satisfied to sufficiently remove the remaining solvent, no side reactions may occur.

The separator thus prepared comprises polymer fibers, inorganic particles and a polymer binder which are introduced in pores formed in gaps between the polymer fibers. Thereby, the average pore diameter of the separator can be controlled on a nanometer scale of 40 to 200 nm, thereby inhibiting the generation of a leak current and eventually preventing the insulating property of electrochemical devices from being deteriorated.

Also, by introducing the inorganic particles in pores which are present in gaps between the polymer fibers, the mechanical strength of the separator can increase.

In addition, such a separator can be used in an electrochemical device to allow the same flux of lithium ions in plane and thickness directions, thereby enhancing the performances of the electrochemical device.

In the present invention, after the step of S3, a slurry comprising inorganic particles, a polymer binder and a solvent may be further applied on at least one surface of the non-woven fabric substrate, followed by drying the applied slurry, to form a porous coating layer.

The further formation of the porous coating layer can inhibit the non-woven fabric substrate made of polymer fibers from undergoing heat-shrinkage when electrochemical devices are overheated later.

The separator prepared by the method of the present invention can be interposed between a cathode and an anode to prepare an electrochemical device.

The electrochemical device of the present invention may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

In the present invention, electrodes to be used together with the separator are not particularly limited, and may be manufactured by binding an electrode active material to an electrode current collector according to a conventional method known in the art. As a cathode active material, those that are commonly used in cathodes of conventional electrochemical devices may be used. Non-limiting examples of the cathode active material may include a lithium-manganese oxide, a lithium-cobalt oxide, a lithium-nickel oxide, a lithium-iron oxide, and a combination thereof, i.e., a lithium-containing composite oxide. Also, as an anode active material, those that are commonly used in anodes of conventional electrochemical devices may be used, and non-limiting examples thereof include metallic lithium, lithium alloys, and lithium intercalation materials such as carbon, petroleum coke, activated carbon, graphite and other carbonaceous materials. Non-limiting examples of a usable cathode current collector include aluminum foils, nickel foils and a combination thereof. Non-limiting examples of a usable anode current collector include copper foils, gold foils, nickel foils, copper alloy foils and a combination thereof.

The electrolyte solution which may be used in the present invention is obtained by dissolving or dissociating a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte solution may be introduced in any suitable step during the manufacturing of the electrochemical device depending on the manufacturing processes and desired physical properties of a final product. Specifically, the electrolyte may be introduced before assembling a battery or in the final step of the assembling.

The separator of the present invention may be applied in batteries by lamination or stack of the separator and the electrodes, and folding, as well as a conventional winding process.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

Example 1: Preparation of Separator (1) Production of Dispersion

Aluminum oxide ($Al_2O_3$) as inorganic particles, styrene butadiene rubber (SBR) as a polymer binder and carboxymethyl cellulose (CMC) were mixed in a ratio of 95:4:1, and the mixture was added to water as a solvent, followed by carrying out a bead-mill process, to obtain a dispersion. In the dispersion, polymer fibers made of polyethylene terephthalate and having an average thickness of 5 μm were mixed and dispersed to finally produce a dispersion.

(2) Formation of Non-Woven Fabric Web

The dispersion produced above was applied on a glass substrate by using a doctor blade to form a non-woven fabric web.

(3) Drying and Compression

The non-woven fabric web formed above was subject to drying and compression at 80° C. for 2 minutes, to obtain a separator.

Comparative Example

A conventional non-woven fabric substrate, which is made of a material having the same components and thickness as the polymer fibers used in the Example and having the same thickness as the non-woven fabric web formed in the Example, was used as a separator.

Evaluation for Properties of Separator

The separator of the Example and the non-woven fabric substrate of the Comparative Example were each evaluated for their air permeability by measuring Gurley values according to the method defined as the Japanese Industrial Standard Gurley (JIS Gurley). The term "air permeability" refers to the time in seconds required for 100 cc of air to pass through one square inch of a separator at constant pressure of 4.8 inches of air. Meanwhile, the pore size distribution and the average pore diameter of each separator were measured according to the method of non-mercury porosimetry.

As a result, the separator of the Example was confirmed to exhibit an air permeability of about 20 seconds and have an average pore diameter of 80 nm. FIG. 1 is an SEM photograph showing a cross-section of the separator obtained in the Example.

In contrast, the separator of the Comparative Example was confirmed to exhibit an air permeability of about 0 seconds and have an average pore diameter of about 10 μm.

Charging and Discharging Test of Coin-Type Cell

The separator of the Example and the non-woven fabric substrate of the Comparative Example were each interposed between a cathode and an anode which have been conventionally used in secondary batteries, to obtain each coin-type cell. The coin-type cell comprising the non-woven fabric substrate of the Comparative Example experienced a problem of not completely charging during a CV charging process, whereas the coin-type cell comprising the separator of the Example was normally charged and discharged.

The present invention has been described in detail above. However, it should be understood that the detailed description and specific examples, while indicating preferred embodiments of the present invention, are given by way of illustration only, since various changes and modifications within the spirit and scope of the disclosure will become apparent to those skilled in the art from this detailed description. Also, it should be understood that the Examples of the present invention are provided for the purpose of illustrations only and to better explain to a person having ordinary skill in the art, and is not intended to limit the scope of the present invention. Accordingly, the scope of the present invention to be protected should be decided by the claims attached, and other equivalents and modifications could be made thereto without departing from the spirit and scope of the present invention.

What is claimed is:

1. A method of preparing a separator, comprising:
   mixing inorganic particles, a polymer binder, polymer fibers, and a solvent to form a dispersion;
   forming a non-woven fabric web from the dispersion, wherein, in the non-woven fabric web, the inorganic particles are adhered to the polymer fibers by the polymer binder and are positioned in pores formed in gaps in the non-woven fabric web present between the polymer fibers; and
   drying and compressing the non-woven fabric web to obtain a separator in the form of a non-woven fabric substrate, wherein the pores of the separator has an average pore size of 40 to 200 nm,
   wherein the polymer binder is selected from the group consisting of polyvinylidene fluoride (PVDF), hexafluoro propylene (HFP), polyvinylidene fluoride-co-hexafluoro propylene, polyvinylidene fluoride-co-trichloro ethylene, styrene butadiene rubber (SBR), carboxymethyl cellulose (CMC), polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinyl-alcohol, cyanoethylcellulose, cyanoethylsucrose, pullulan, carboxyl methyl cellulose, acrylonitrile-styrene-butadiene copolymer, polyimide and a mixture thereof, and wherein the polymer fibers are selected from the group consisting of polyolefins, polyesters, polyacetals, polyamides, polycarbonates, polyimides, polyetherether ketone, polyether sulfone, polyphenylene oxide, polyphenylene sulfide and a mixture thereof.

2. The method according to claim 1, wherein the dispersion further comprises a dispersant.

3. The method according to claim 2, wherein the dispersant is selected from the group of consisting of polyvinylpyrrolidone, polyacrylic acid hydrazide, poly-N-vinyl-5-methoxazolidon, N-alkyl polyimine, polyvinylalcohol, N-acetyl polyimine, polyacrylamide, poly-L-lysinhydrobromide, polyacroleine, benzyl-dodecyl-dimethylammonium chloride, polyacrylic acid, polyethylenimine, 4-vinylpyridine, methylvinylketone, and an oligomer thereof.

4. The method according to claim 1, wherein the dispersion is produced by dispersing the inorganic particles in the solvent to obtain an inorganic dispersion, and adding the polymer binder and the polymer fibers to the inorganic dispersion.

5. The method according to claim 1, wherein the inorganic particles are selected from the group consisting of inorganic particles having a dielectric constant of 5 or higher, inorganic particles having the ability to transport lithium ions, and a mixture thereof.

6. The method according to claim 5, wherein the inorganic particles having a dielectric constant of 5 or higher are selected from the group consisting of $SrTiO_3$, $SnO_2$, $CeO_2$, MgO, NiO, CaO, ZnO, $ZrO_2$, $SiO_2$, $Y_2O_3$, $Al_2O_3$, AlOOH, $Al(OH)_3$, $TiO_2$, SiC, $BaTiO_3$, $Pb(Zr_x, Ti_{1-x})O_3$ (PZT, $0<x<1$), $Pb_{1-x}La_xZr_{1-y}TiO_3$ (PLZT, $0<x<1$, $0<y<1$), $(1-x)Pb(Mg_{1/3}Nb_{2/3})O_3-xPbTiO_3$(PMN-PT, $0<x<1$), $HfO_2$ inorganic particles and a mixture thereof.

7. The method according to claim 5, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

8. The method according to claim 1, wherein the inorganic particles have an average diameter of 0.001 to 100 μm.

9. The method according to claim 1, wherein the polymer fibers have an average thickness of 0.05 to 10 μm.

10. The method according to claim 1, wherein the solvent is selected from the group consisting of acetone, methanol, ethanol, tetrahydrofuran, methylene chloride, chloroform, dimethylform amide, N-methyl-2-pyrrolidone (NMP), cyclohexane, water and a mixture thereof.

11. The method according to claim 1, wherein the drying and compressing of the non-woven fabric web is carried out at a temperature of 60 to 150° C. for 30 seconds to 10 minutes.

12. The method according to claim 1, which further comprises applying a slurry comprising inorganic particles, a polymer binder and a solvent on at least one surface of the non-woven fabric substrate, and drying the applied slurry to form a porous coating layer, after obtaining the non-woven fabric substrate.

13. A separator prepared by the method according to claim 1.

14. An electrochemical device, comprising a cathode, an anode and a separator interposed between the cathode and the anode, wherein the separator is defined in claim 13.

15. The electrochemical device according to claim 14, which is a lithium secondary battery.

* * * * *